United States Patent

[11] 3,576,221

| [72] | Inventor | Horst H. Hasiba<br>Pittsburgh, Pa. |
|---|---|---|
| [21] | Appl. No. | 845,065 |
| [22] | Filed | July 25, 1969 |
| [45] | Patented | Apr. 27, 1971 |
| [73] | Assignee | Gulf Research & Development Company<br>Pittsburgh, Pa. |

[54] HIGH-DENSITY DRILLING LIQUID FOR HYDRAULIC JET DRILLING
5 Claims, No Drawings

[52] U.S. Cl. ................................................ 175/66, 175/67
[51] Int. Cl. .................................................. E21b 7/18
[50] Field of Search ........................................ 175/57, 65, 67, 66

[56] References Cited
UNITED STATES PATENTS
2,919,898  1/1960  Marwil et al. ................. 175/66
3,416,614  12/1968  Goodwin et al. ............... 175/67
3,467,211  9/1969  Goodwin et al. ............... 175/67

*Primary Examiner*—James A. Leppink
*Attorneys*—Meyer Neishloss, Deane E. Keith and Paul L. Tillson ABSTRACT: The density of drilling liquid used in hydraulic jet drilling of hard formations subjected to abnormal pressures of fluids in the formation is controlled by incorporating in the drilling liquid solid ferrous particles having a size in the range of 20 to 50 mesh in the U.S. Sieve Series in a concentration of at least about seven percent by volume to increase the density of the drilling liquid to the desired density above 11 pounds per gallon. Data are presented to show that increasing the density of the drilling liquid with the ferrous particles having a size in the range of 20 to 50 mesh increases the drilling rate whereas increasing the density of the drilling liquid with conventional weighting agents decreases the drilling rate.

HIGH-DENSITY DRILLING LIQUID FOR HYDRAULIC JET DRILLING

This invention relates to drilling and more particularly to a method of increasing the density of drilling liquid used to drill high-pressure formations by the hydraulic jet-drilling method.

In the conventional rotary-drilling method, a drilling mud is circulated down through a rotating drill pipe and discharged from a drill bit secured to the lower end of the drill pipe. The drilling mud carries cuttings from the bottom of the hole up the annulus between the drill pipe and the borehole wall and is discharged from the well at the surface into equipment for treating the drilling liquid. One of the functions of the drilling mud is to counteract fluid pressures in formations penetrated during the drilling by maintaining a hydrostatic pressure in the borehole higher than the formation pressure. Because some formations are under abnormally high pressures, it is necessary to increase the density of the drilling mud to provide the necessary hydrostatic pressure in the borehole by incorporating a weighting agent in the drilling liquid. Barite, the most widely used weighting agent, has a particle size such that substantially none of the barite is retained on a 325-mesh screen. If other weighting agents such as iron oxide are added to the drilling mud to increase its density, the particle sizes of the weighting agent are substantially the same as the particle sizes of barite. Clay solids are not generally considered to be weighting agents because concentrations of clay high enough to increase the density substantially cause excessive viscosities.

A method that has recently been developed for the drilling of hard formations is hydraulic jet drilling. In that drilling method, an abrasive-laden drilling liquid is pumped down a rotating drill pipe into a rotating drill bit and is discharged through nozzles in the drill bit at a velocity exceeding 650 feet per second. High-velocity jets of drilling liquid discharged from the nozzles erode the bottom of the borehole. The drilling liquid is recirculated up the hole and serves the same function as drilling mud in conventional rotary drilling of carrying cuttings from the hole and counteracting fluid pressures in the formations penetrated. If the fluid pressures in the formations are abnormally high, it is necessary to increase the density of the drilling liquid by the addition of a suitable weighting agent. Unfortunately, the addition of weighting agents to increase the density of the drilling liquid has been found to cause a serious reduction in drilling rate with a consequent increase in the cost of drilling.

This invention resides in a method of hydraulic jet drilling through hard subsurface formations subjected to abnormally high fluid pressures. In accordance with this invention, the density is increased to the desired level above about 11 pounds per gallon by the addition to the drilling liquid of ferrous particles having a size larger than 50 mesh. It is preferred to maintain the desired drilling liquid density by the addition of ferrous abrasive particles having substantially the same particle size as the abrasive initially incorporated in the drilling liquid. The preferred abrasive material for maintaining the desired drilling liquid density in accordance with this invention is steel shot having a particle size larger than 50 mesh.

The term "hydraulic jet drilling" used throughout this specification refers to a drilling process in which an abrasive-laden liquid is pumped down a drill pipe and discharged from nozzles in a rotating drill bit at the lower end of the drill pipe. Rotation of the drill bit is ordinarily accomplished by securing the drill bit to the lower end of the drill pipe and rotating the drill pipe, but the rotation of the drill bit can be independent of the drill pipe. The drilling liquid is discharged at a velocity of at least 650 feet per second through a plurality of nozzles extending through the lower end of the drill bit. The velocity is obtained by a pressure drop of at least 4,000 p.s.i., and as high as about 15,000 p.s.i., through the nozzles.

It has been found that nozzles having a diameter of about one-eighth inch are particularly suitable. Larger nozzles increase the total amount of drilling liquid that must be pumped to obtain the desired high velocities of the drilling liquid discharged from the nozzles without a commensurate increase in the penetration of the formation drilled. Nozzles of smaller diameter limit the size of abrasive particles that can be used.

In the hydraulic jet-drilling process the actual forward penetration of the formation drilled is by the erosion caused by impingement of the high-velocity streams of abrasive-laden liquid against the end of the borehole. Preferably the nozzles in the drill bit are spaced to cut a plurality of concentric grooves in the end of the borehole. The ridges between the grooves are broken off mechanically, but the forward penetration is the result of the erosion by the jet streams rather than mechanically cutting into the rock in the bottom of the borehole. Cuttings from the bottom of the borehole are carried up to the surface by the drilling liquid which is treated at the surface to be put in condition for reuse.

The preferred abrasives that have been used in the hydraulic jet-drilling process are ferrous abrasives which are ordinarily dispersed in the drilling liquid in a concentration in the range of 1 to 6 percent by volume. The abrasives can be either cast iron or steel and the particles can be in the form of either grit or shot. Preferred abrasives for the hydraulic jet-drilling process are steel shot which are available as an ordinary commercial abrasive product. The incorporation of 6 percent by volume ferrous abrasives in suitable drilling liquids results in a density of approximately 10.5 pounds per gallon. The size of the abrasives is such that they pass through a 20-mesh screen and are retained on a 50-mesh screen in the U.S. Sieve Series. Preferred abrasives have a size in the range of 30 to 45 mesh in the U.S. Sieve Series with an average particle diameter of $18.9 \times 10^{13}$ inches. A commercial ferrous abrasive that can be used is designated as S—110 and comprises particles in a very narrow range of particle sizes such that 50.6 percent of the particles remain on a 45-mesh screen and 46 percent remain on a 50-mesh screen.

The drilling liquid can be any liquid capable of suspending the abrasive particles and cuttings not only during the actual drilling when the drilling liquid is circulated at substantial velocities, but also when drilling and the circulation of the drilling liquid are interrupted. The drilling liquids may be aqueous liquids, oil base liquids or emulsions of water and oil such as diesel oil. Preferred drilling liquids are suspensions in water of paper fibers and a clay, preferably a low-yield clay such as Attapulgite, in concentrations that will allow the drilling liquid to suspend the abrasive particles. A suitable drilling liquid is a suspension in water of one-half percent to 5 percent by weight wood fibers having a fiber length of 1 to 5 mm. and 1 to 7 percent Attapulgite clay. Conventional drilling mud additives added to drilling muds to control specific properties such as water loss, pH, etc. of the drilling muds may be added to the drilling liquid. Drilling liquids containing asbestos fibers in place of the wood fibers can be used. Suspensions of clay solids alone in high enough concentrations to suspend ferrous abrasives have the disadvantage of high viscosities which cause high-pressure drop in the drill pipe.

In the use of this invention in hydraulic jet drilling of the borehole of a well through hard formations, rock removed from the bottom of the borehole is carried upwardly through the annulus between the drill pipe and the borehole wall to the wellhead where it is discharged with the drilling liquid onto screens for the removal of large cuttings from the drilling liquid. The drilling liquid is then passed through suitable separating equipment such as cyclone separators to separate broken particles of abrasive from the drilling liquid. It is preferred to remove from the drilling liquid ferrous abrasive particles smaller than 50 mesh; however, a sharp cut of that size often is not possible with the equipment available. In any event, it is essential to this invention to remove substantially all broken abrasive particles and other solid particles other than clay solids and paper fibers having a size smaller than 80 mesh to reduce the density to below about 8.7 lbs./gal. Ferrous particles larger than 50 mesh are then added to the treated drilling liquid from which the fines have been removed, in an amount exceeding about 7 percent by volume to increase the density of the drilling liquid to the desired range. After adjustment of its density to the desired range, the drilling liquid is recirculated down the drill pipe for further use in the drilling operation.

I have found that the decreased drilling rate caused by increasing the density of the drilling liquid above 11.0 lbs./gal. with the weighting agents heretofore used can be avoided by increasing the density of the drilling liquid and maintaining the density of the drilling liquid in a desired range exceeding about 11 lbs./gal. by the addition to the drilling liquid of ferrous abrasive particles having a size larger than 50 mesh. In the preferred method of treatment of the drilling liquid in accordance with this invention, drilling liquid delivered at the surface for reconditioning is treated to remove all ferrous particles and cuttings smaller than the abrasive originally added and then ferrous abrasive particles are added to the drilling liquid in an amount giving the drilling liquid the desired density.

A standard test has been developed to determine the effectiveness of nozzles, abrasives and drilling liquids in drilling hard formations by hydraulic jet drilling. The drilling rates obtained in the standard test have been found to give good correlations with drilling rates obtained in the field. A single nozzle is suspended in an offcenter position above a rotating target of black granite. Drilling liquid is discharged through the nozzle at a known and controlled velocity to impinge on the target while the target is rotated through two complete revolutions. The rate of drilling is determined by the depth of the groove cut in the granite.

A standard drilling liquid having a density of approximately 10 lbs./gal. and containing 3 percent Aquagel (a bentonitic clay), 3 percent wood fiber, 10 percent diesel oil and approximately 4 percent by volume steel shot was used in the test to determine the effect on drilling rate of increasing the density of the drilling liquid with various weighting agents. The drilling rate was determined for drilling liquids having densities ranging up to approximately 16 lbs./gal. The results of the test are set forth in Table I:

resulted in increasing the drilling rate with an increase in density of the drilling liquid. Steel Grit G-325 had a screen analysis of 53 percent in 80—200 mesh range and 47 percent smaller than 200 mesh.

The treatment of drilling liquid used in hydraulic jet drilling in accordance with this invention allows hard subsurface formations subjected to abnormal pressures to be drilled by the hydraulic jet-drilling method at high drilling rates. The term "hard formations" is used to designate formations having a compressive strength in excess of 20,000 pounds per square inch and characteristics such that they cannot be drilled economically with the conventional rotary drill bits which mechanically penetrate the bottom of the borehole. Abnormal formations are those subjected to a formation pressure higher than the pressure corresponding to a gradient of 0.45 pound per square inch per foot of depth. In the method of this invention, the density of drilling liquid necessary to counteract such abnormal pressures is obtained by the incorporation of 7 to 20 percent by volume of ferrous abrasives having a particle size larger than 50 mesh in the drilling liquid.

I claim:

1. In a method for the hydraulic jet drilling of a well through hard formations subjected to abnormal formation pressures in which abrasive-laden drilling liquid is pumped down the well through drill pipe into a drill bit, discharged at a velocity of at least 650 feet per second through nozzles in the drill bit against the bottom of the borehole to penetrate the hard formations, recirculated upwardly through the borehole around the drill pipe to the upper end of the borehole, discharged from the upper end of the borehole and treated for further use, and recirculated down the borehole to the drill bit for further drilling, the improvement comprising separating from the drilling liquid discharged from the upper end of the borehole solid particles of cuttings larger than the abrasive and fine particles of abrasive having a size smaller than 80 mesh, adding to the drilling liquid from which the cuttings and fine particles of abrasive are separated ferrous abrasive particles having a size larger than 50 mesh in an amount to increase the concentration in percent by volume of the ferrous

TABLE I

Drilling Rate—Mud Density Relationship for Several Weighting Materials

| Weighting material | Mud density, $\rho_{measured}$ (p.p.g.) | Abrasive concentration, $C_{measured}$ (percent volume) | Pressure drop through nozzle $\Delta P_{ACT}$ (p.s.i.) | Jet velocity, $V_{jet}$ (ft./sec.) | Drilling rate s, (in./sec.) | Drilling-rate in percent of s. at 4% C |
|---|---|---|---|---|---|---|
| G-325 steel grit | 9.8 | 4.1 | 5,500 | 791 | 0.250 | 110.0 |
|  | 12.1 | 4.1 | 6,850 | 795 | 0.070 | 28.0 |
|  | 14.25 | 4.1 | 8,050 | 794 | 0.039 | 15.6 |
|  | 16.15 | 4.1 | 9,100 | 793 | 0.023 | 9.2 |
| Zinc chloride | 9.8 | 4.3 | 5,500 | 791 | 0.273 | 100.0 |
|  | 12.6 | 4.0 | 7,150 | 796 | 0.226 | 82.8 |
|  | 14.7 | 3.9 | 8,300 | 794 | 0.156 | 57.1 |
|  | 15.8 | 3.9 |  |  |  |  |
| Barite (field grade) | 10.0 | 4.5 | 5,600 | 790 | 0.281 | 100.0 |
|  | 12.35 | 4.3 | 7,000 | 795 | 0.242 | 86.1 |
|  | 14.25 | 4.1 | 8,000 | 791 | 0.203 | 72.2 |
|  | 15.6 | 4.2 | 8,800 | 793 | 0.180 | 64.0 |
|  | 16.0 | 4.1 | 9,000 | 792 | 0.172 | 61.2 |
| S-170 steel shot [1] | 10.0 | 4.6 | 5,600 | 790 | 0.297 | 100.0 |
|  | 11.3 | 8.0 | 6,400 | 795 | 0.328 | 110.4 |
|  | 12.3 | 12.0 | 6,900 | 791 | 0.406 | 136.7 |
|  | 14.1 | 16.4 | 7,900 | 791 | 0.437 | 147.1 |
|  | 14.8 | 19.6 | 8,300 | 791 | 0.453 | 152.5 |

[1] Steel shot having an average particle size of $18.9 \times 10^{-3}$ inches and the following screen analysis.—2%, on 30 mesh screen; 36.5%, on 35 mesh screen; 48.8%, on 40 mesh screen; 14.1%, on 45 mesh screen; 0.1%, on 50 mesh screen.

It will be observed from Table I that increasing the density of the drilling liquid with any of the weighting agents other than the steel shot resulted in a marked reduction in the drilling rate with an increase in the density of the drilling liquid. The most marked reduction in drilling rate occurred when the density of the drilling liquid was increased by increasing the concentration of steel grit in the drilling liquid. In contrast, increasing the density of the drilling liquid by the addition of steel shot having a size larger than 50 mesh abrasive particles in the drilling liquid to give a drilling liquid having the desired density higher than 11, and recirculating the resulting drilling liquid to the drill bit.

2. A method as set forth in clam 1 in which the amount of ferrous abrasive added to the drilling liquid is adapted to maintain a concentration of approximately 7 to 20 percent by volume of ferrous abrasive in the drilling liquid.

3. A method as set forth in claim 1 in which the abrasive is steel shot of 20 to 50 mesh particle size.

4. A hydraulic jet method for drilling a well through hard formations subjected to abnormal pressures comprising circulating down rotating drill pipe a drilling liquid having steel shot particles larger than 50 mesh suspended therein, discharging the drilling liquid at a velocity of at least 650 feet per second from nozzles in a drill bit mounted on the lower end of the drill pipe, returning the drilling liquid and entrained cuttings up the well through the annulus between the drill pipe and the borehole wall of the well, removing cuttings larger than the steel shot particles from the drilling liquid returned up the well, removing solid particles smaller than 50 mesh from the drilling liquid from which the cuttings have been removed, adding steel shot to the drilling liquid from which cuttings and solid particles smaller than 50 mesh have been removed to raise the concentration of the steel shot in the drilling liquid to the range of approximately 7 to 20 percent by volume to increase the density to a density above 11.0 pounds per gallon and adequate to counteract abnormal pressures in formations drilled, and recirculating the drilling liquid to which the steel shot is added down the drill pipe for further drilling.

5. A hydraulic jet method for drilling a well through hard formations subjected to abnormal pressure comprising circulating down rotating drill pipe a drilling liquid comprising ferrous abrasive of a size in the range of 20 to 50 mesh in the U.S. Sieve Series, clay solids, and a fibrous material selected from the group consisting of paper fibers and asbestos fibers suspended in an aqueous liquid; discharging the drilling liquid at a velocity of at least 650 feet per second from nozzles in a drill bit mounted on the lower end of the drill pipe; returning the drilling liquid and entrained cuttings up the well through the annulus between the drill pipe and the borehole wall of the well; removing cuttings larger than the ferrous abrasive particles from the drilling liquid returned up the well; removing from the drilling liquid from which the cuttings have been removed substantially all solid particles smaller than 50 mesh other than particles of the fibrous material and particles of clay; adding ferrous abrasives in the size of 20 to 50 mesh in the U.S. Sieve Series to the drilling liquid from which cuttings and solid particles smaller than 50 mesh have been removed to raise the concentration of the ferrous abrasives in the drilling liquid the range of approximately 7 to 20 percent by volume and thereby increase the density of the drilling liquid to a density above 11.0 pounds per gallon and adequate to counteract abnormal pressures in formations drilled; and recirculating the drilling liquid to which the ferrous abrasives are added down the drill pipe for further drilling.